(12) United States Patent
Penner et al.

(10) Patent No.: US 8,057,341 B2
(45) Date of Patent: Nov. 15, 2011

(54) LOW-NOISE CHAIN ACTUATION

(75) Inventors: Stephan Penner, Buehl (DE); Marcus Junig, Buehl (DE); Anton Simonov, Buehl (DE); Michael Pichura, Buehl (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 463 days.

(21) Appl. No.: 12/291,808

(22) Filed: Nov. 13, 2008

(65) Prior Publication Data

US 2009/0143179 A1 Jun. 4, 2009

Related U.S. Application Data

(60) Provisional application No. 61/003,105, filed on Nov. 14, 2007.

(51) Int. Cl.
*F16G 13/04* (2006.01)

(52) U.S. Cl. .......................... 474/212; 474/206; 474/234

(58) Field of Classification Search .................. 474/202, 474/206, 212, 213, 214, 215, 234
See application file for complete search history.

(56) References Cited

U.S. PATENT DOCUMENTS

| 3,377,875 A | 4/1968 | Sand |
| 3,752,035 A | 8/1973 | Cozzy et al. |
| 5,993,344 A | 11/1999 | Young |
| 7,059,985 B2 * | 6/2006 | Markley et al. ............... 474/213 |
| 2007/0155564 A1 * | 7/2007 | Ledvina et al. ............... 474/215 |

FOREIGN PATENT DOCUMENTS

| DE | 43 16 877 A1 | 11/1993 |
| JP | 55024203 | 2/1980 |
| JP | 2005257056 | 9/2005 |
| WO | WO 2006026288 | 3/2006 |

* cited by examiner

*Primary Examiner* — Emmanu M Marcelo

(74) *Attorney, Agent, or Firm* — Davidson, Davidson & Kappel LLC

(57) ABSTRACT

A chain drive with at least two sprocket wheels provided with teeth having an evolvent spline, and a toothed chain that engages therewith, especially for a vehicle propulsion system, which toothed chain includes individual rows of link plates that have openings, wherein the link plates are movably connected with each other by rocker pieces penetrating the openings and have chain teeth. The chain drive is characterized in that the tooth flanks of at least one tooth of least one of the sprocket wheels are designed differently.

17 Claims, 5 Drawing Sheets

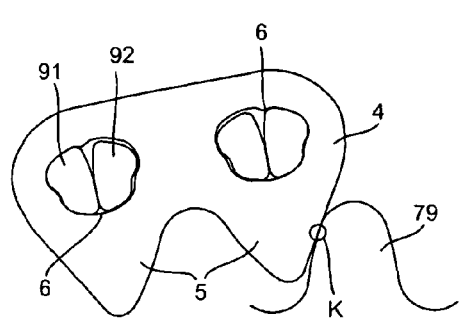
Pulling Mode
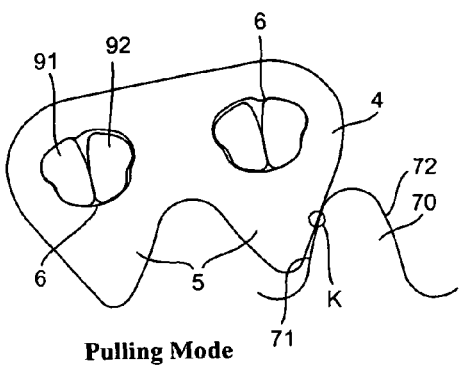
Pulling Mode
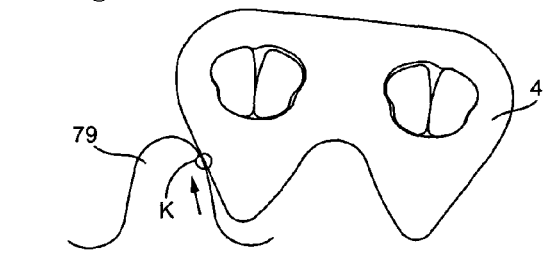
Pushing Mode
Fig. 4 (State of the Art)
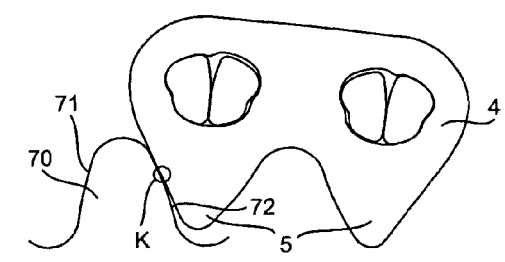
Pushing Mode
Fig. 5

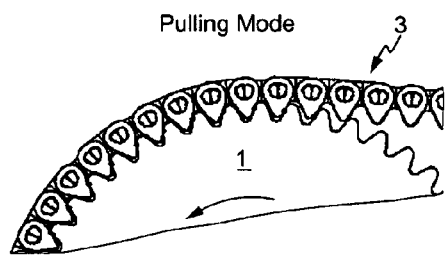
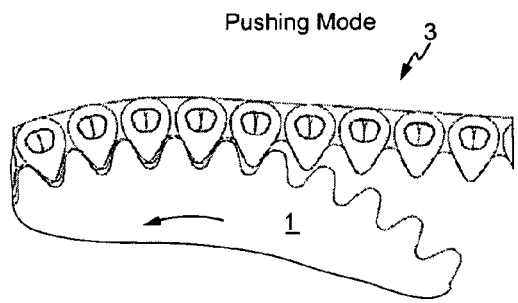
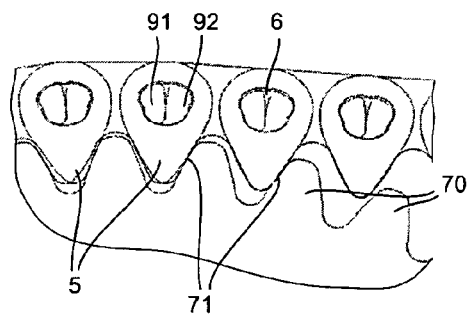
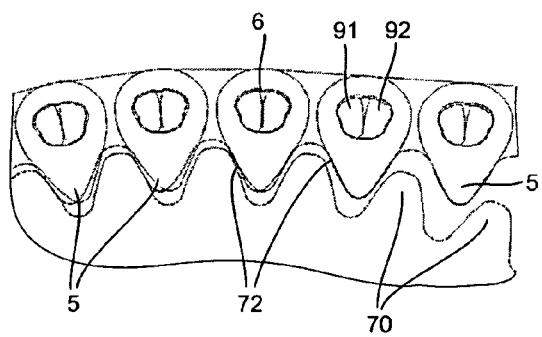
Fig. 6                                    Fig. 7

LOW-NOISE CHAIN ACTUATION

Priority to U.S. Provisional Patent Application Ser. No. 61/003,105, filed Nov. 14, 2007 is claimed, the entire disclosure of which is hereby incorporated by reference herein.

The invention relates to a chain drive having a driving and driven sprocket wheel as well as a driving drive chain connected to them.

BACKGROUND

Such toothed chains are used at several locations in the vehicle propulsion system, for example in all-wheel power divider transmissions, front transverse-mounted transmissions for bridging the axial distance to the differential, as drive chains of a hydraulic auxiliary aggregate within the transmission, as a valve train control chain of an internal combustion engine, or as a drive chain for other auxiliary aggregates of the vehicle (coolant pump, lubricant pump, air-conditioning system compressor, hybrid additional motor, brake booster, etc.). As is generally known, a distinction is drawn between toothed chains, bushed roller chains and roller chains. The invention relates to a chain drive with a toothed chain, wherein the sprocket wheels are provided with an involute spline. The teeth of the drive chain engage in the gaps between the teeth of the sprocket wheels to create a positive, non-slip connection between the drive chain and respective sprocket wheel for transmitting torque.

When using a plate-link chain as the toothed chain that runs at a fixed ratio between two gears, structure-borne noise is introduced into the system from the impact impulse of the link plates on the tooth flanks of the gears that has a negative acoustic effect. The tooth engagement frequencies arising from this impact impulse exist at every speed. The speed of the system only determines the frequency which increases with the speed at which the chain or chain drive rotates.

It is known to optimize the acoustic properties of a chain drive with a toothed chain and sprocket wheels e.g. by randomizing the plate lengths. Furthermore, the acoustics can be optimized by using two parallel toothed chains that run offset from each other by one-half plate link.

In DE 43 16 877 A1, it is already known to design the drive chain of a chain drive such that the sequential engagement of the chain links in the sprocket wheels is irregular to interfere with the monotone note of the impact impulse so that the sound of the chain drive becomes increasingly random. The known methods described as state-of-the-art in this document generate an irregular chain link impact frequency for example by an irregular pitch of the sprocket wheel teeth or drive chain links, or by unevenly designing the engagement flanks of the drive chain teeth in the drive chain. The goal of these measures is to achieve random chain meshing. The above described measures can be summarized by the term "slight randomness." It has been revealed that measures in which slight randomness is used are comparatively involved and hence expensive to produce. Another known measure described in the above-cited document uses a drive chain composed of a plurality of individual chains that run parallel with each other, and the associated sprocket wheels are rotated at a predetermined angle in relation to each other. The phases of the impact frequencies of the different individual chains are thereby offset in relation to each other, and the masses simultaneously contacting the divided gears are reduced. This solution is also very involved to construct and produce and is hence comparatively expensive.

SUMMARY OF THE INVENTION

The invention is based on the problem of creating another chain drive with reduced noise during operation.

An object of the invention is to provide the flanks of a sprocket wheel tooth with different geometries. This difference may be achieved by means of various measures. These measures can also be combined. The flanks of the teeth of a sprocket wheel should be designed asymmetrically. In particular, the pressure angles should differ. This yields a main direction of rotation on the gears. In pulling mode, the front flank in the direction of rotation of the first (drive) sprocket wheel pulls the chain into the wrap. The toothed chain therefore engages across the cited flank. If pulling mode switches to pushing mode, for example when driving downhill without engine traction, the tight strand in pulling mode becomes the loose strand in pushing mode, and vice versa. In this case, the flanks of the teeth of the link plates on the front flank (viewed in the direction of rotation) push the second, presently driving sprocket wheel. The chain meshing with the sprocket wheel has a major influence on the acoustics. By using different flank geometries for the sprocket wheel, the acoustics of the chain drive can be intentionally improved for pulling and pushing mode. Since the forces in both modes are different, the point where force is applied on the plate flank in known chain drives may also differs with reference to the gear flank. The present invention counteracts this effect by means of the claimed improvements to the flanks of the teeth of the sprocket wheels.

A chain drive according to the invention therefore has at least two sprocket wheels, wherein the teeth of the sprocket wheels are provided with evolvent teeth. While the chain drive is operating, these teeth are engaged in the teeth of link plates of a plate-link chain. The link plates are arranged in rows in a known manner, wherein the individual plates have openings that are penetrated by pressure pieces. The rocker members, of which two are usually in each opening, form a rocker joint with the openings such that the individual tooth plates form a movable toothed chain. Additional guide plates can be provided. The chain drive according to the invention is therefore distinguished in that the tooth flanks of at least one tooth of least one of the sprocket wheels are designed differently. Such a tooth therefore has two differently-designed tooth flanks that can be identified as the front and back flank, or the working flank and rear flank with reference to a specific direction of rotation. The geometries of the front and back flanks of at least one tooth of a sprocket wheel are therefore different.

According to one embodiment of the invention, the front and back flanks of at least one tooth of a sprocket wheel may be different in that the pressure angle differs.

It is preferable for the pressure angle of the front flank in the drive direction to be steeper than the pressure angle of the back flank in the drive direction. A steeper pressure angle in this case means a smaller pressure angle at the front flank than at the back flank of the tooth corresponding to the generally known evolvent construction.

In one embodiment of the chain drive according to the invention, the pressure angles range from 0.2° to 7°. The pressure angles themselves measure 22° to 38°.

In a particularly preferred embodiment of the chain drive according to the invention, both sprocket wheels are provided with teeth that have differently-sized pressure angles. The front flanks of the teeth in the direction of rotation have a smaller pressure angle.

In addition to the different embodiment of the pressure angle of the tooth flanks, it is also possible to design the pitches of at least two teeth of at least one sprocket wheel differently.

Furthermore, one inventive concept is to design the thicknesses of at least two teeth differently, wherein the difference is preferably 0.1 mm to 0.7 mm.

According to one embodiment of the invention, the measures comprising the different pressure angles, and/or the different pitches, and/or the different tooth thicknesses are combined.

In the chain drive according to the invention, it can be provided that the driving sprocket wheel, driven sprocket wheel or both sprocket wheels have teeth with different pressure angles and/or different pitches and/or different thicknesses.

According to additional embodiments of the chain drive according to the invention, the first sprocket wheel can be larger than the second sprocket wheel. The sprocket wheels can have 20 to 100 teeth and/or a ratio of 0.2 to 5.

The chain drive according to the invention is for use in a vehicle, especially in a vehicle transmission.

BRIEF DESCRIPTION OF THE DRAWINGS

Exemplary embodiments of the invention will be further explained below with reference to the drawings. The drawing shows the following:

FIG. 7 The meshing situation between the chain and sprocket wheel in pushing mode.

DETAILED DESCRIPTION

Figure 1:
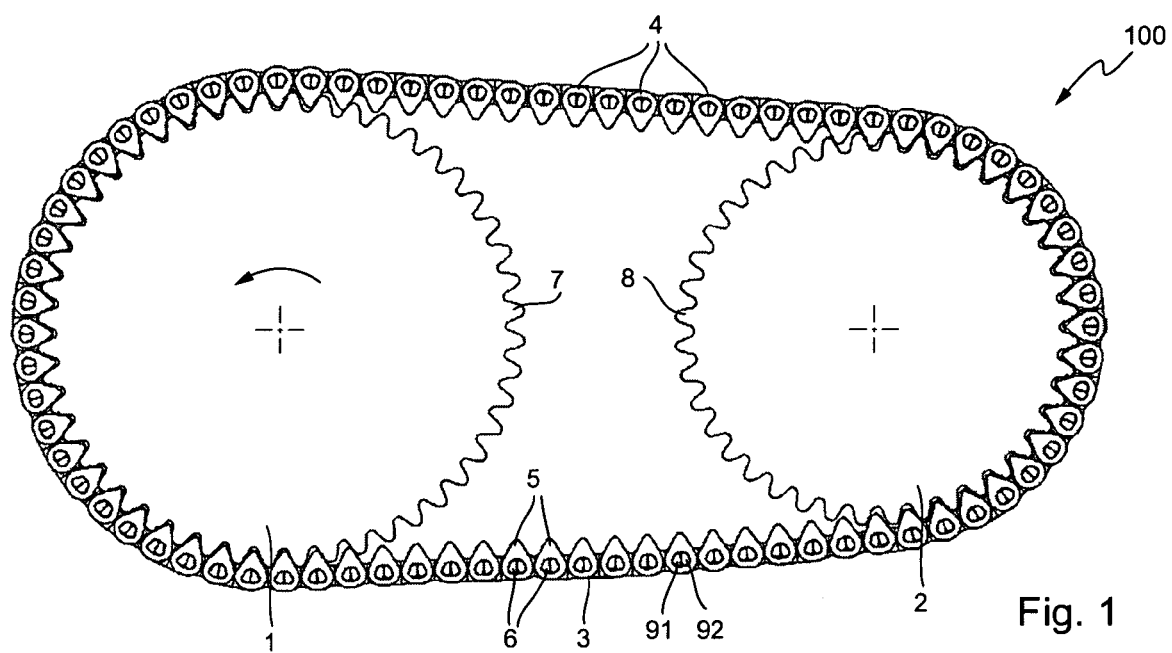
FIG. 1 Simplified depiction of a chain drive.

FIG. 1 is a schematic representation of a chain drive 100 according to the invention having a driven sprocket wheel 1, a driving sprocket wheel 2, and a torque-transmitting toothed chain 3 that connects them. The toothed chain 3 consists of a plurality of plates 4 that are arranged in series perpendicular to the direction of travel of the toothed chain 3 and extend offset from each other in the peripheral direction of the toothed chain 3. The plates 4 each have two chain teeth 5 to engage in the teeth 7, 8 of the sprocket wheels 1, 2, as well as to openings in 6. The openings 6 are penetrated in each case by two rocker pieces 91, 92 that ensure the connection of the plates 4 with each other, and that form a rocker joint with the walls of the openings 6. The direction of rotation is counterclockwise as indicated by the arrow. In the following figures, the rotational direction is also counterclockwise.

Figure 2A:
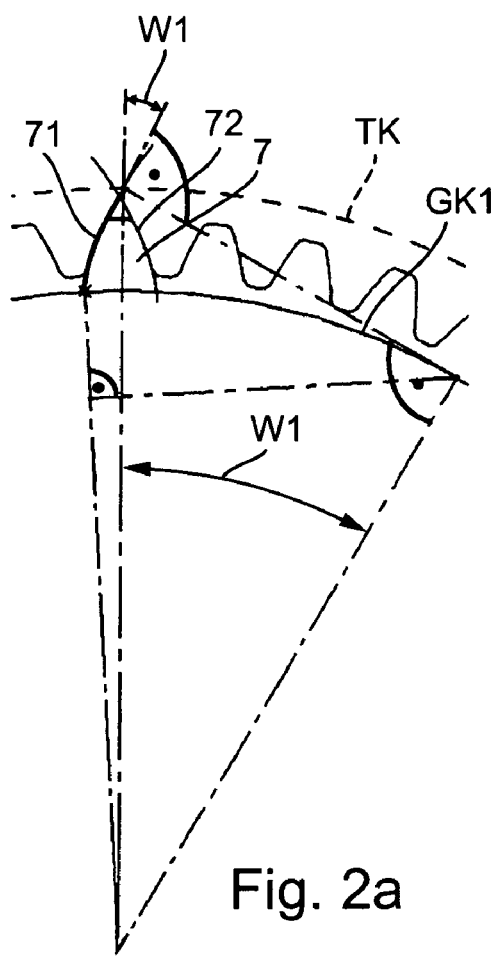
FIG. 2a and FIG. 2b The geometric relationships of the pressure angle of evolvent teeth, FIG. 3 Two sprocket wheels with different pitch FIG. 4 The shift of the contact point when changing from pulling to pushing mode for a chain drive according to the state of the art, FIG. 5 The shift of the contact point when changing from pulling to pushing mode for a chain drive according to the invention, FIG. 6 The meshing situation between the chain and sprocket wheel in pulling mode.
Figure 2B:
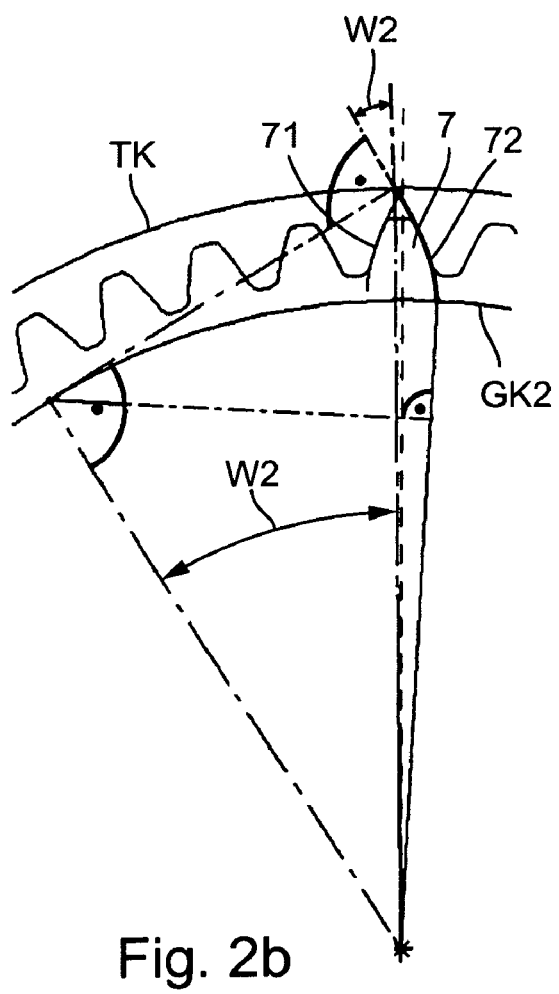

FIGS. 2a and 2b show an embodiment according to the invention of a tooth 7 of the sprocket wheel 1 with two tooth flanks 71 and 72, wherein FIG. 2a portrays the geometric details of the front tooth flank 71 in the rotational direction of the sprocket wheel 1, and FIG. 2b portrays the geometric details of the back flank 72 with pressure angles W1, W2, pitch circle diameters TK, and base circle diameters GK1, GK2. The pitch circle diameters TK are the same for both flanks 71, 72, whereby the base circle diameters GK1 and GK2 are different. Since the construction of an evolvent as a tooth flank is generally known, the relationships between the geometric quantities will not be further discussed. For tooth 7 of the sprocket wheel 1 according to the invention, the pressure angle W1 of flank 71 is smaller than the corresponding angle W2 of the back flank 72. The pressure angle W1 of flank 71 is approximately 30°, and that of flank 72 is approximately 32°.

Figure 3:
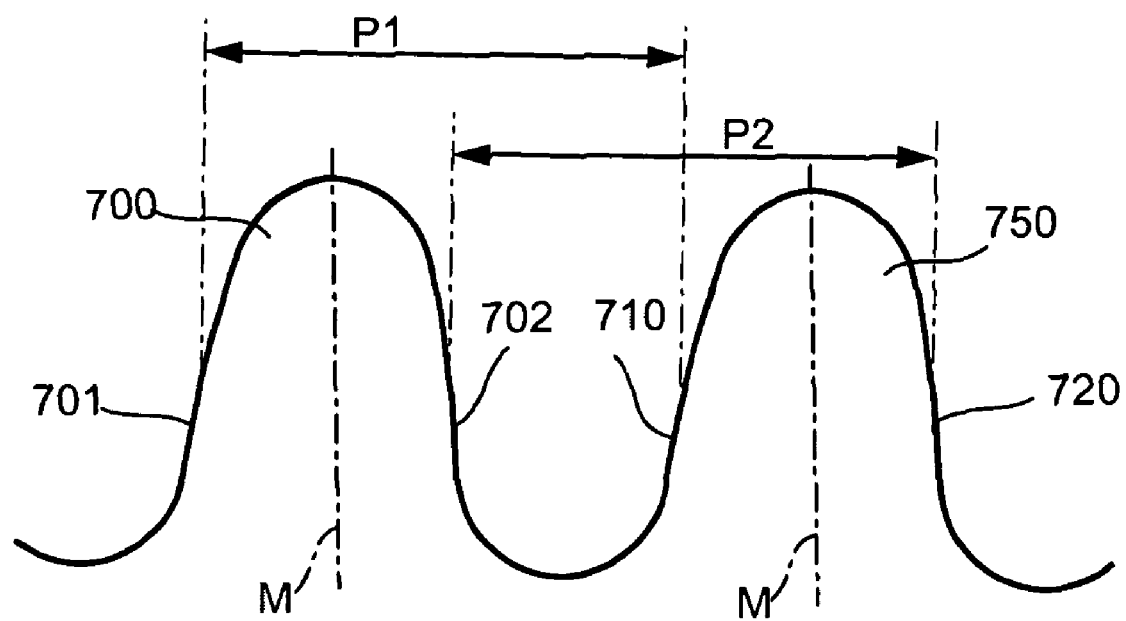

FIG. 3 shows another possibility to asymmetrically design the flanks 701, 702, 710 and 720 of two teeth 700 and 750 of a sprocket wheel by giving the front tooth flanks 701 and 710 a different pitch P1 than the back flanks 702 and 720 with pitch P2.

FIG. 4 shows the meshing situation of a prior-art chain drive in pulling and pushing mode, where the top diagram portrays pulling mode, and the bottom diagram portrays pushing mode. One can see that a contact point K between the chain tooth 5 of the chain plate 4 and a tooth 79 of a sprocket wheel is shifted upward in the direction of the arrow when the load changes. Such a shift always causes noise and thereby worsens the acoustics.

In contrast to FIG. 4, FIG. 5 shows the same meshing conditions but with a chain drive according to the invention. Given the adapted asymmetrical front and back flanks 71 and 72, the contact point K which is the force application point does not shift when switching from pulling to pushing mode which substantially improves the acoustics.

FIGS. 6 und 7 show that different tooth flanks 71 and 72 are active in pulling and pushing mode with the chain drive according to the invention. FIG. 6 shows pulling mode in which only the front flanks 71 of the tooth 70 contact the chain teeth 5 of the toothed chain 3. In comparison, tooth 70 and chain tooth 5 only contact each other by means of the back flank 72.

What is claimed is:

1. A chain drive comprising:
   at least two sprocket wheels with teeth having an evolvent spline; and
   a toothed chain, engaging with the sprocket wheels, the toothed chain including individual rows of link plates that have openings, the link plates being movably connected with each other by rocker pieces penetrating the openings and have chain teeth, wherein front and back tooth flanks of at least one tooth of at least one of the sprocket wheels are designed differently.

2. The chain drive as recited in claim 1 wherein the differing front and back tooth flanks have different pressure angles.

3. The chain drive as recited in claim 2 wherein the pressure angle of a front flank in a drive direction is steeper than the pressure angle of a back flank in the drive direction.

4. The chain drive as recited in claim 3 wherein the pressure angles range from 0.2° to 7°.

5. The chain drive as recited in claim 2 wherein the pressure angles are 22° to 38°.

6. The chain drive as recited in claim 2 wherein the sprocket wheels are provided with teeth with different pressure angles, and the front flanks of the teeth in a direction of rotation have a smaller pressure angle.

7. The chain drive as recited in claim 2 wherein the pressure angles of the front and back teeth flanks of the at least one tooth of the at least one sprocket wheel are different, and/or the teeth of the at least one sprocket wheel having different pitches and/or the teeth of the at least one sprocket wheel are of different thickness.

8. The chain drive as recited in claim 1 wherein the teeth of the at least one sprocket wheel have different pitches.

9. The chain drive as recited in claim 1 wherein the thicknesses of at least two teeth of the at least one sprocket wheel are different.

10. The chain drive as recited in claim 9 wherein the difference in thickness is 0.1 mm to 0.7 mm.

11. The chain drive as recited in claim 1 wherein the at least two sprocket wheels have teeth with differently designed front and back flanks and/or different pitches.

12. The chain drive as recited in claim 1 wherein the at least two sprocket wheels include an externally driven sprocket wheel and a sprocket wheel driven by the toothed chain, the externally driven sprocket wheel being larger than the sprocket wheel driven by the toothed chain.

13. The chain drive as recited in claim 1 wherein the sprocket wheels have between 20 and 100 teeth.

14. The chain drive as recited in claim 1 wherein the sprocket wheels have a ratio of approximately 0.2 to 5.

15. A vehicle using the chain drive as recited in claim 1.

16. A sprocket wheel for a chain drive as recited in claim 1.

17. The chain drive as recited in claim 1 wherein the chain drive is for a vehicle propulsion system.

* * * * *